Patented Apr. 19, 1949

2,467,859

UNITED STATES PATENT OFFICE 2,467,859

PREPARATION OF PYRETHRIN CONCENTRATE

Nicholas A. Sankowsky, Scotch Plains, N. J., assignor, by mesne assignments, to Standard Oil Development Company, a corporation of Delaware No Drawing. Application December 15, 1945, Serial No. 635,429

2 Claims. (Cl. 260—468)

This invention relates to the preparation of insecticides containing pyrethrins, and in particular to the concentration of pyrethrin for the preparation of more potent insecticide compositions containing pyrethrins.

It is usual to obtain pyrethrins suitable for the preparation of insecticides by the solvent extraction of pyrethrum flowers with various solvents such as ethylene dichloride or petroleum distillates to obtain upon evaporation an oleoresin containing the insecticidal principles of the flowers. This oleoresin contains as impurities and diluting constitutents quantities of such insecticidal inert materials as fats, waxes, fatty acids and coloring matter. The more commonly prepared insecticidal solutions, however, are obtained by dissolving the oleoresin in suitable concentration in a petroleum distillate. Many of these preparations are objectionable as household sprays because the hitherto difficultly removable impurities and diluting constituents cause the staining of fabrics. The present invention is concerned with the substantial elimination of such impurities and diluting constituents and with the preparation of concentrates which may be advantageously shipped for the subsequent preparation of commercial spraying compositions.

The pyrethrins in the oleoresin are esters with multiple properties. Many solvents have been investigated for the extraction of the pyrethrins from association with the fatty acid constituents by treatment with alkaline reagents. The separation of the waxes and fatty compounds has been attempted by the cooling of solutions obtained by dissolving the oleoresin in a variety of solvents but particularly petroleum ether. The combination of such treating methods has resulted in the concentration of the pyrethrins to a substantial degree. The methods, however, by which such concentrates are obtained are in general tedious and require considerable length of time to effect. In the present invention, a mixture of immiscible solvents for the pyrethrins is employed and, by freezing either solution or the combined solutions, separation is thereby obtained of the larger amount of the impurities while the pyrethrins remain in solution. By such processing, concentration of the pyrethrins from pyrethrum flowers can be easily and rapidly accomplished.

Thus, it has been found that when the oleoresin obtained by the treatment of pyrethrum flowers with a light petroleum distillate is subsequently treated with a mixture of relatively immiscible solvents for the pyrethrins, separation of a concentrate of the pyrethrin can be obtained upon cooling of either solution or the combined solutions to temperatures of from 0° C. to —70° C.; the particular solution cooled depends upon the relative content of the pyrethrins. The solvents commonly employed in this capacity are the lower non-volatile petroleum distillates coupled with the various lower aliphatic alcohols admixed with water whenever necessary to render the mixture immiscible with respect to the petroleum distillate. Separation of the bulk of the impurities from the cooled solution is then made by filtering the solution. The filtering of the resultant solutions are easily effected since the precipitated material from the mixed solutions is of a hard and rigid nature and has been commonly termed a "concrete." It has been found that the content of pyrethrins in the dissolved matter in solution by such simple treatment may be about 50%, while that in the separated solid is usually less than 5% by weight.

To illustrate the application of the process more specifically, the following detailed example of procedure is presented:

An extract of pyrethrum flowers in a petroleum kerosene distillate containing about 5% pyrethrin was treated counter-currently in a liquid-liquid contacting tower with anhydrous methanol. The methanol solution, upon evaporation, was found to contain 14.38% pyrethrins. When the methanol solution was cooled to —65° C., a precipitate was obtained. This precipitate was of a hard, resinous nature. The resultant mixture was then filtered. The filtrate was concentrated by careful distillation to yield a solution containing 45.87% pyrethrins, while the solid contained 4.6% pyrethrins.

What is claimed is:

1. The process for preparing a pyrethrin concentrate from a pyrethrum oleoresin which comprises dissolving the pyrethrum oleoresin in a petroleum kerosene distillate to give a solution of about 5% concentration, countercurrently treating resultant solution with anhydrous methyl alcohol, cooling the methyl alcohol thus obtained to —65° C. and filtering.

2. The process for preparing an active pyrethrin concentrate from a petroleum kerosene solution of a pyrethrum oleoresin containing active pyrethrins and inert materials which comprises selectively extracting the kerosene solution with a lower aliphatic alcohol having a lower freezing point than the kerosene and which is substantially immiscible with the kerosene to give an extract containing the pyrethrins with only a small proportion of the kerosene and of the inert materials, separating the resulting alcohol extract from the residual kerosene solution, cooling the separated alcohol extract to a temperature at which the kerosene freezes out as a solid, and filtering out the thus solidified kerosene from the alcohol extract at a temperature in the range of 0° C. to −70° C., whereby the active pyrethrin concentrate is obtained as a filtrate.

NICHOLAS A. SANKOWSKY.

REFERENCES CITED

The following references are of record in the file of this patent:

UNITED STATES PATENTS

| Number | Name | Date |
|---|---|---|
| 1,945,235 | Sankowsky et al. | Jan. 30, 1934 |
| 2,044,502 | Haller et al. | June 16, 1936 |
| 2,372,183 | Barthel et al. | Mar. 27, 1945 |
| 2,376,702 | Komeda | May 22, 1945 |